US011829507B2

(12) United States Patent
Barber et al.

(10) Patent No.: US 11,829,507 B2
(45) Date of Patent: Nov. 28, 2023

(54) METHODS AND SYSTEMS FOR PRIVACY PROTECTION VERIFICATION

(71) Applicant: DataGrail, Inc., San Francisco, CA (US)

(72) Inventors: Daniel Barber, San Francisco, CA (US); Earl Hathaway, Pacifica, CA (US); Ignacio Zendejas, San Jose, CA (US)

(73) Assignee: DataGrail, Inc., San Francisco, CA (US)

( * ) Notice: Subject to any disclaimer, the term of this patent is extended or adjusted under 35 U.S.C. 154(b) by 199 days.

(21) Appl. No.: 16/855,476

(22) Filed: Apr. 22, 2020

(65) Prior Publication Data

US 2021/0334401 A1 Oct. 28, 2021

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC .. G06F 21/6245; G06F 21/6227; G06F 21/31; G06Q 10/10; G06Q 50/265; H04L 63/102
USPC .......................................................... 726/26
See application file for complete search history.

(56) References Cited

U.S. PATENT DOCUMENTS

| | | | |
|---|---|---|---|
| 8,595,499 | B2 | 11/2013 | Haider et al. |
| 9,185,086 | B1 | 11/2015 | Talati |
| 9,483,535 | B1 | 11/2016 | Coyle et al. |
| 10,184,882 | B2 | 1/2019 | Humphrey et al. |
| 11,157,652 | B2 | 10/2021 | Basava et al. |
| 11,526,627 | B2 | 12/2022 | Barber et al. |
| 2012/0259782 | A1 | 10/2012 | Hammad |
| 2015/0095968 | A1 | 4/2015 | Steiner et al. |

(Continued)

OTHER PUBLICATIONS

U.S. Appl. No. 16/947,289, filed Jul. 27, 2020, Barber et al.

(Continued)

*Primary Examiner* — Jeffrey C Pwu
*Assistant Examiner* — Nega Woldemariam
(74) *Attorney, Agent, or Firm* — Weaver Austin Villeneuve & Sampson LLP

(57) ABSTRACT

Systems and methods for verifying requests for personal information are described. A server computing system may receive a request for personal information associated with a requester, the request sent based on a government regulation related to consumer privacy rights, the request including a first identifier provided by the requester, the personal information stored in one or more databases based on one or more past transactions engaged between the requester and an entity associated with the one or more databases. The server computing system may search the one or more databases using the first identifier to identify a second identifier related to the first identifier, the second identifier stored in the one or more databases by the entity based on the one or more past transactions. The server computing system may verify identity of the requester using at least the second identifier. Based on successfully verifying the identity of the requester, the server computing system may generate a notification indicating that the request for the personal information is accepted.

21 Claims, 12 Drawing Sheets

(56) References Cited

U.S. PATENT DOCUMENTS

| | | |
|---|---|---|
| 2017/0111364 A1 | 4/2017 | Rawat |
| 2017/0193249 A1 | 7/2017 | Luria |
| 2017/0287035 A1 | 10/2017 | Barday |
| 2017/0287036 A1 | 10/2017 | Barday |
| 2017/0324586 A1 | 11/2017 | Kim et al. |
| 2018/0159900 A1 | 6/2018 | Barday |
| 2018/0183803 A1 | 6/2018 | Singh et al. |
| 2018/0302392 A1 | 10/2018 | Gordon et al. |
| 2018/0373890 A1 | 12/2018 | Barday et al. |
| 2019/0286839 A1 | 9/2019 | Mutha et al. |
| 2019/0318122 A1 | 10/2019 | Hockey et al. |
| 2019/0340613 A1 | 11/2019 | Ghosh et al. |
| 2019/0392173 A1* | 12/2019 | Brannon .............. G06F 21/6245 |
| 2019/0392176 A1 | 12/2019 | Taron et al. |
| 2019/0392177 A1 | 12/2019 | Brannon et al. |
| 2020/0050792 A1 | 2/2020 | Barday et al. |
| 2020/0057864 A1 | 2/2020 | Parthasarathy |
| 2020/0167501 A1* | 5/2020 | Brannon .............. G06F 21/6245 |
| 2020/0204545 A1 | 6/2020 | Pacella et al. |
| 2020/0233977 A1 | 7/2020 | Chickerur et al. |
| 2020/0267283 A1 | 8/2020 | Tong |
| 2020/0387637 A1 | 12/2020 | Koren et al. |
| 2021/0141929 A1* | 5/2021 | Hydro ................ G06F 21/6245 |
| 2021/0204116 A1 | 7/2021 | Naujok et al. |
| 2021/0334407 A1 | 10/2021 | North et al. |
| 2022/0027512 A1 | 1/2022 | Barber et al. |
| 2022/0067130 A1 | 3/2022 | Dabbs |
| 2022/0129586 A1 | 4/2022 | Barber et al. |
| 2023/0153463 A1 | 5/2023 | Barber et al. |

OTHER PUBLICATIONS

International Search Report and Written Opinion dated Jul. 7, 2021 issued in Application No. PCT/US2021/028561.

International Search Report and Written Opinion dated Oct. 18, 2021, in application No. PCT/US2021/043188.

Notice of Allowance dated Nov. 26, 2021 issued in U.S. Appl. No. 16/947,289.

U.S. Non-Final office Action dated Apr. 27, 2022 in U.S. Appl. No. 16/947,289.

U.S. Notice of Allowance dated Jan. 24, 2022 in U.S. Appl. No. 16/947,289.

U.S. Notice of Allowance dated Aug. 3, 2022 in U.S. Appl. No. 16/947,289.

U.S. Non-Final office Action dated Sep. 2, 2022 in U.S. Appl. No. 16/949,411.

International Preliminary Report on Patentability dated Nov. 3, 2022, in PCT Application No. PCT/US2021/028561.

U.S. Notice of Allowance dated Oct. 13, 2022 in U.S. Appl. No. 16/947,289.

U.S. Appl. No. 18/050, 184, inventors Barber et al., filed Oct. 27, 2022.

International Preliminary Report on Patentability dated Feb. 9, 2023, in PCT Application No. PCT/US2021/043188.

U.S. Final office Action dated Mar. 20, 2023 in U.S. Appl. No. 16/949,411.

U.S. Notice of Allowance dated Aug. 4, 2023, in U.S. Appl. No. 18/050,184.

\* cited by examiner

METHODS AND SYSTEMS FOR PRIVACY PROTECTION VERIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to information privacy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

In general, information privacy relates to the privacy of personal information and may be associated with the collection, storing and sharing of the personal information. The personal information may be collected with knowledge of the owners and may include information that is not publicly available. There are privacy laws that provide the owners of the personal information the rights to request for the information, to have their information removed, to control the sale of their data, and to prohibit the disclosure or misuse of the personal information.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 6D shows an example of a second verification interface, in accordance with some implementations.

FIG. 7 shows an example of a verification result interface, in accordance with some implementations.

DETAILED DESCRIPTION

Figure 1:
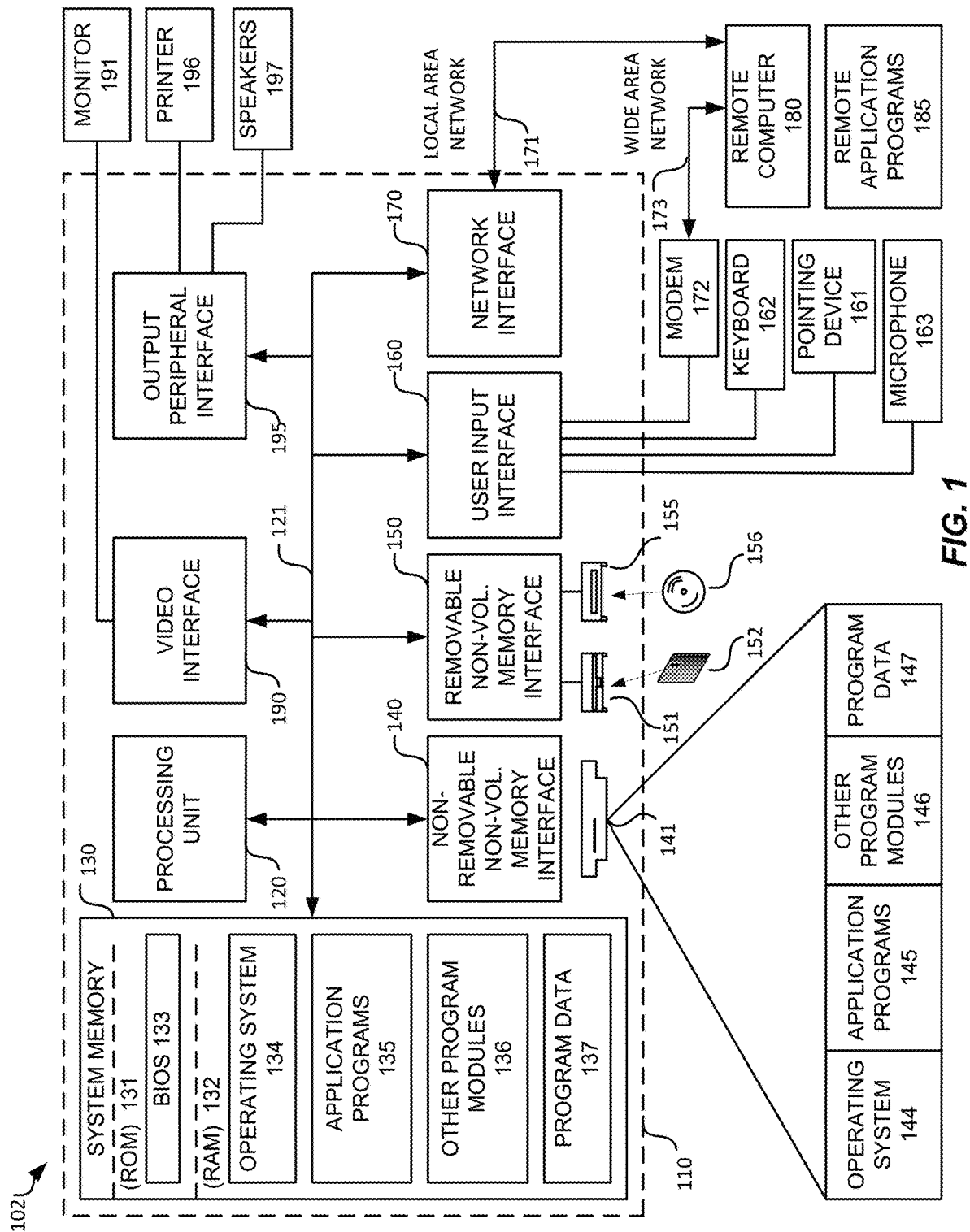
FIG. 1 shows a diagram of an example computing system that may be used with some implementations.

In general, personal information may include information that is shared by or collected from an individual with knowledge of the individual. For example, the California Consumer Privacy Act ("CCPA") Section 1798.140(o)(1) that goes into effect on Jan. 1, 2020 defines personal information as information that identifies, relates to, describes, is reasonably capable of being associated with, or could reasonably be linked, directly or indirectly, with a particular consumer or household. The CCPA indicates that personal information may include identifiers such as a real name, alias, postal address, unique personal identifier, online identifier, internet protocol address, email address, account name, social security number, driver's license number, passport number, or other similar identifiers. Personal information may include biometric information, Internet or other electronic network activity information, including, but not limited to, browsing history, search history, and information regarding a consumer's interaction with an internet website, application, or advertisement, geolocation data, professional or employment-related information, and education information, among others. Section 1798.100 (a) of the CCPA also indicates that a consumer shall have the right to request that a business that collects a consumer's personal information disclose to that consumer the categories and specific pieces of personal information the business has collected.

Examples of systems and methods associated with verifying personal information requests will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method for verifying requests for personal information, the method comprising receiving, by a server computing system, a request for personal information associated with a requester, the request sent based on a government regulation related to consumer privacy rights, the request including a first identifier provided by the requester, the personal information stored in a database based on one or more past transactions engaged between the requester and an entity associated with the database; searching, by the server computing system, the database using the first identifier to identify a second identifier related to the first identifier, the second identifier stored in the database by the entity based on the one or more past transactions; verifying, by the server computing system, identity of the requester using at least the second identifier; and based on successfully verifying the identity of the requester: transmitting, by the server computing system, a notification to the requester indicating that the request for the personal information is accepted; and searching, by the server computing system, the database for the personal information based on one or more of the first identifier and the second identifier.

The disclosed implementations may include a system for verifying requests for personal information and may include one or more processors, and a non-transitory computer readable medium storing a plurality of instructions, which when executed, cause the one or more processors of a server computing system to receive a request for personal information associated with a requester, the request sent based on a government regulation related to consumer privacy rights, the request including a first identifier provided by the requester, the personal information stored in a database based on one or more past transactions engaged between the requester and an entity associated with the database; search the database using the first identifier to identify a second identifier related to the first identifier, the second identifier stored in the database by the entity based on the one or more past transactions; verify identity of the requester using at least the second identifier; and based on successfully verifying the identity of the requester: transmit a notification to the requester indicating that the request for the personal information is accepted; and search the database for the personal information based on one or more of the first identifier and the second identifier.

The disclosed implementations may include a computer program product comprising computer-readable program code to be executed by one or more processors of a server computing system when retrieved from a non-transitory computer-readable medium, the program code including instructions to receive a request for personal information associated with a requester, the request sent based on a government regulation related to consumer privacy rights, the request including a first identifier provided by the requester, the personal information stored in a database based on one or more past transactions engaged between the requester and an entity associated with the database; search the database using the first identifier to identify a second identifier related to the first identifier, the second identifier stored in the database by the entity based on the one or more past transactions; verify identity of the requester using at least the second identifier; and based on successfully verifying the identity of the requester: transmit a notification to the requester indicating that the request for the personal information is accepted; and search the database for the personal information based on one or more of the first identifier and the second identifier.

While one or more implementations and techniques are described with reference to verifying requests for personal information implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. The term "database" as used herein may refer to any Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some implementations. In diagram 102, computing system 110 may be used by a user to establish a connection with a server computing system. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

FIG. 1 includes a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
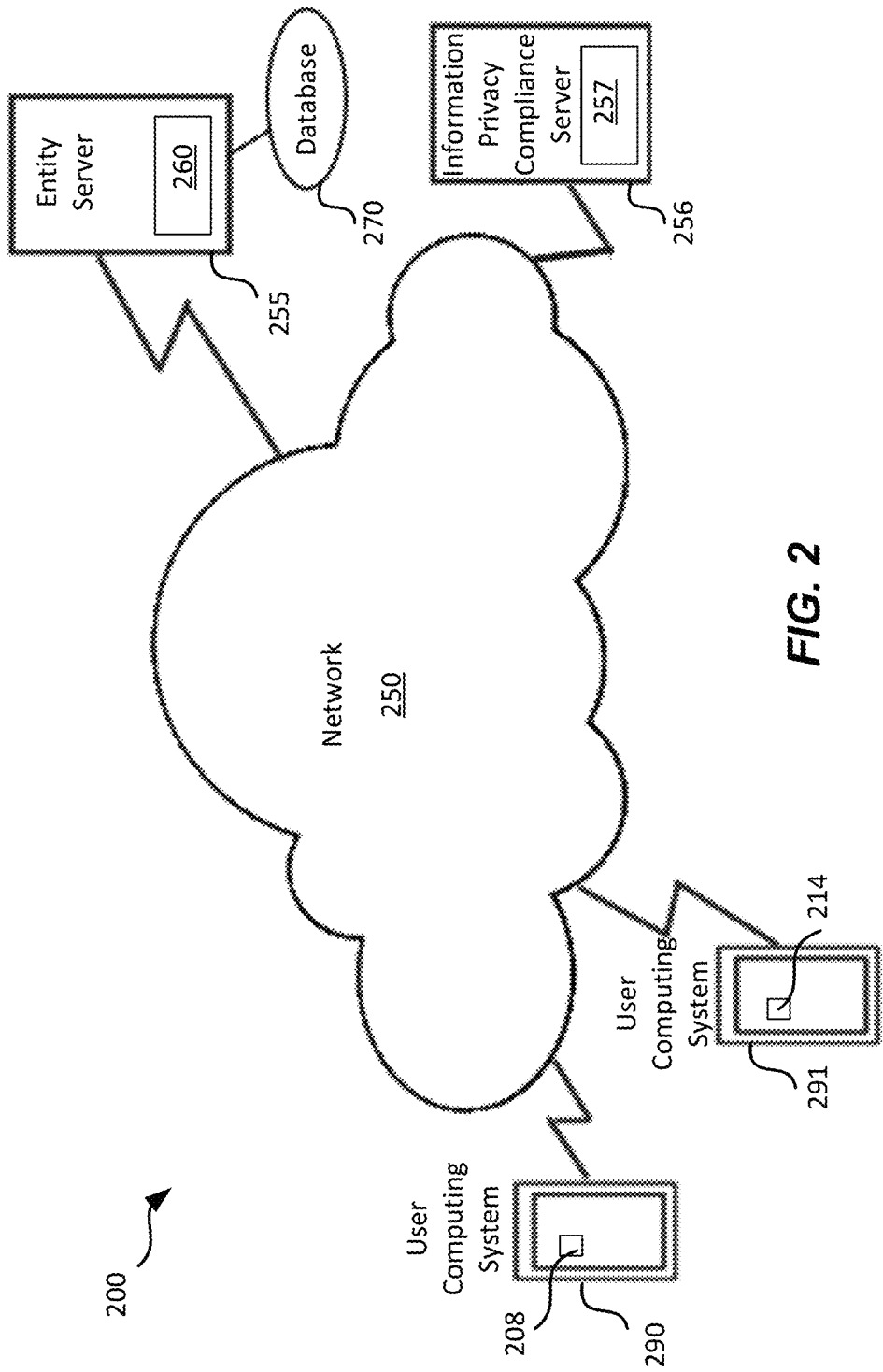
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 256 via the network 250.

The server computing system 255 (also referred to as an entity server) may be coupled with database 270 and may be associated with an entity. The entity may be an organization or a business that has legally collected and stored personal information from many consumers. For example, CCPA Section 1798.140(c)(1) defines a business as a sole proprietorship, partnership, limited liability company, corporation, association, or other legal entity that is organized or operated for the profit or financial benefit of its shareholders or other owners that collects consumers' personal information or on the behalf of which that information is collected and that alone, or jointly with others, determines the purposes and means of the processing of consumers' personal information, that does business in the State of California within certain thresholds.

Each of the computing systems 290 and 291 may include an application module such as module 208 or 214. For example, a user may use the computing system 290 and the application module 208 (e.g., browser application) to login to a web application 260 hosted by the entity server 255. The user may engage in transactions with the web application 260 and may provide consent to enable personal information of the user to be collected by the web application 260. The personal information may be stored in the database 270. For example, a transaction may be a registration operation such as when the user registers with the web application 260, or the transaction may involve purchase and payment operations such as when the user places an item into an online shopping cart and checks out by paying with a credit card.

The server computing system 256 (also referred to as information privacy compliance server) may be coupled with the entity server 255 and may include information privacy compliance application 257. The information compliance application 257 may be configured to operate on behalf of an entity associated with the entity server 255 to enable the entity to stay in compliance with privacy laws. One of the computing systems 290 and 291 may be used to initiate a request for personal information to the entity server 255. For some implementations, the personal information request may be received and processed by the information privacy compliance server 256.

Figure 3:
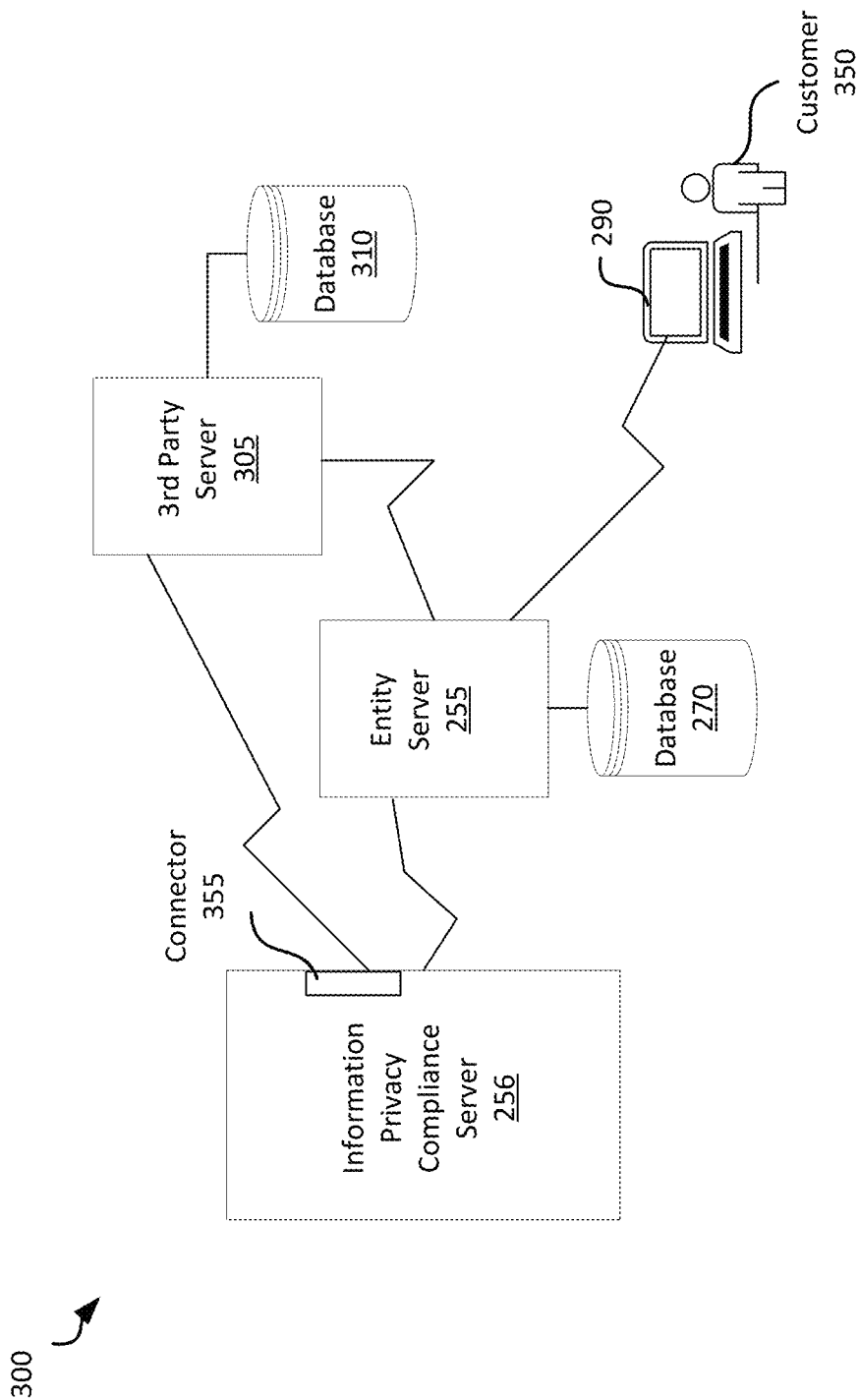
FIG. 3 shows an example diagram that includes a span of databases or systems where personal information may be stored, in accordance with some implementations.

FIG. 3 shows an example diagram that includes a span of databases or systems where personal information may be stored, in accordance with some implementations. Diagram 300 includes an information privacy compliance server 256, an entity server 255 associated with an entity, a third-party server 305 associated with the entity, and a customer 350 of the entity. For some implementations, an entity may be associated with one or more third-party servers to perform services on its behalf. For example, the entity may be an online furniture business, and it may be associated with an email marketing service to perform marketing campaign on its behalf. In this example, the furniture business may be associated with the entity server 255, and the email marketing service may be associated with the third-party server 305. The email marketing service may send marketing emails on behalf of the furniture business using a list of contacts provided by the furniture business. The list of contacts may be stored in a database (e.g., database 270) associated with the furniture business. The list of contacts may be considered as one set of personal information.

When the customer 350 interacts with an email from the email campaign, the email marketing service may collect personal information about the customer 350 including, for example, the device (e.g., IP address, OS information, browser information, etc.) used by the customer 350 and the interaction (e.g., browsing activities, etc.) by the customer 350. Cookies and tracking technologies may be used, and the collected information about the customer 350 may be stored by the email marketing service in the database 310 on behalf of the furniture business. The information collected by the email marketing service may be considered another set of personal information attributed to the furniture business. As such, the personal information collected and stored on behalf of the furniture business may be stored in the database 270 and in the database 310. It may also be noted that the furniture business in this example may be associated with multiple third-party services, and the personal information collected on its behalf may span multiple databases or systems. For example, the website of the furniture business may be hosted by another third-party service, and content of shopping carts of its customers may be stored in a database of this other third-party service. The third-party service may be implemented based on a software as a service (SaaS) platform where the applications and files associated with the website of the furniture business may be stored on the third party's servers and databases.

Figure 4:
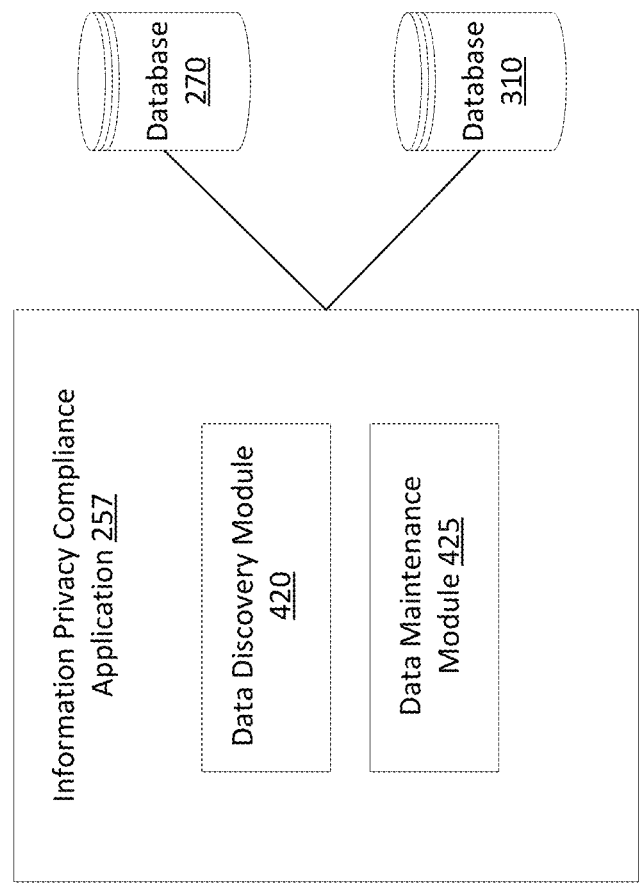
FIG. 4 shows an example diagram of an information privacy compliance application with its discovery function, in accordance with some implementations.

FIG. 4 shows an example diagram of a information privacy compliance application with its discovery function, in accordance with some implementations. Information privacy compliance application 257 may be configured to include data discovery module 420 and data maintenance module 425. For some implementations, the data discovery module 420 may be configured to determine where the entity stores the personal information that it collects from its customers. This may include the personal information that is collected and stored on behalf of the entity by one or more third-party services.

The data discovery module 420 may be configured to communicate with the entity server 255 and the third-party server 305 using application programming interface (API) or connectors (e.g., connector 355 shown in FIG. 3). There may be multiple connectors. A connector may be configured to enable the information privacy compliance server 256 to integrate with a third-party server or system (e.g., a system associated with Salesforce.com of San Francisco, Calif.) and databases (or database-like systems). A connector may be configured to provide a range of functionality including, for example, discovery of personal information, performing an access/deletion/update in the third-party server, discovery of what other systems the third-party system may integrate or communicate with, and data lineage of certain information (e.g., where the information come from if the information came from another system). For some implementations, a connector may communicate via a hybrid of APIs and directly to databases (or database-like systems). A connector may also be configured to provide a layer of intelligence on top of the APIs and databases. For example, the connector 355 included in the information privacy compliance server 256 configured to connect to a third-party system (e.g., a system associated with Marketo, Inc. of San Mateo, Calif.) not only uses the APIs but also infers what other systems Marketo integrates with by using a combination of APIs that don't directly provide the information and inferences used to find the personal information. Similarly, there may be connectors used to connect to various databases and configured to infer where the data may come from. For some implementations, the data discovery module 420 may be associated with multiple connectors to communicate with multiple different server computing systems. For example, the data discovery module 420 may determine where the entity stores one or more of the telephone number, email address, transaction ID and customer identification (ID) of each of its customers. Each of the telephone number, email address, transaction ID and customer ID may be referred to as an identifier. Other identifiers may also be used by the entity and discovered by the data discovery module 420.

For some implementations, the data discovery module 420 may be configured to determine how to link one identifier associated with a customer to another identifier associated with the same customer. For example, when a customer provides an email address, the data discovery module 420 may be able to link the email address to one or more of a telephone number and a customer ID. The telephone number may be stored in a first system or a database associated with the first system, while the customer ID may be stored in a second system or a database associated with the second system.

For some implementations, the data discovery module 420 may be configured to determine the proportion of the different type of identifiers that an entity collects or stores for its customers. For example, the entity may assign a customer ID to each customer who purchases one or more items, and the entity may collect and store an email address from all of these customers; however, the entity may collect and store a phone number from only 40% of these customers because the entity makes providing the phone number optional.

For some implementations, the data discovery module 420 may be configured to determine four categories of personal information: one category used for verification, one category used to include in a personal information report sent to the customer, one category subject to "Do Not Sell", and one category used for deletion and rectification requests. For example, the data discovery module 420 may determine whether the entity collects telephone numbers from its customers and, if so, where the entity stores the telephone numbers. The data discovery module 420 may also determine whether the telephone numbers are available for access, and if so, how the data discovery module 420 can retrieve those telephone numbers. The telephone number information may be used for verification. The discovery performed by the data discovery module 420 may continue and iterate multiple times to discover information that may be indirectly related to the identifier provided by a requester. This may be referred to as identifier expansion, and it may be based on how the entity server 255 structure its database 270 and may span to how the third-party server 305 structures its database 310.

The data discovery module 420 may use the identifier expansion process to map the email address provided by the customer 350 to an account number previously assigned to the customer 350. The data discovery module 420 may the use the account number to search the different databases and may find transaction numbers associated with the customer 350. As the expansion continues, it may be possible that the data discovery module 420 may use personal information stored in one database to map to personal information stored in another database. For example, it may be possible that the account ID stored in a first database be mapped to a transaction ID stored in a second database, and the transaction ID may be used to map to purchase information stored in a third database, with each of the first database, the second database and the third database associated with a different system. During the search, the data discovery module 420 may locate personal information that falls into the category of "Do not Sell", and it may locate personal information that falls into the category of deletion of rectification.

For some implementations, the data maintenance module 425 may be configured to maintain the personal information discovered by the data discovery module 420 so that the personal information may be continuously refreshed. For example, a customer may submit a request to correct the personal information that the entity may currently have about the customer. The information submitted by the customer may then be received and processed by the data maintenance module 425.

Figure 5:
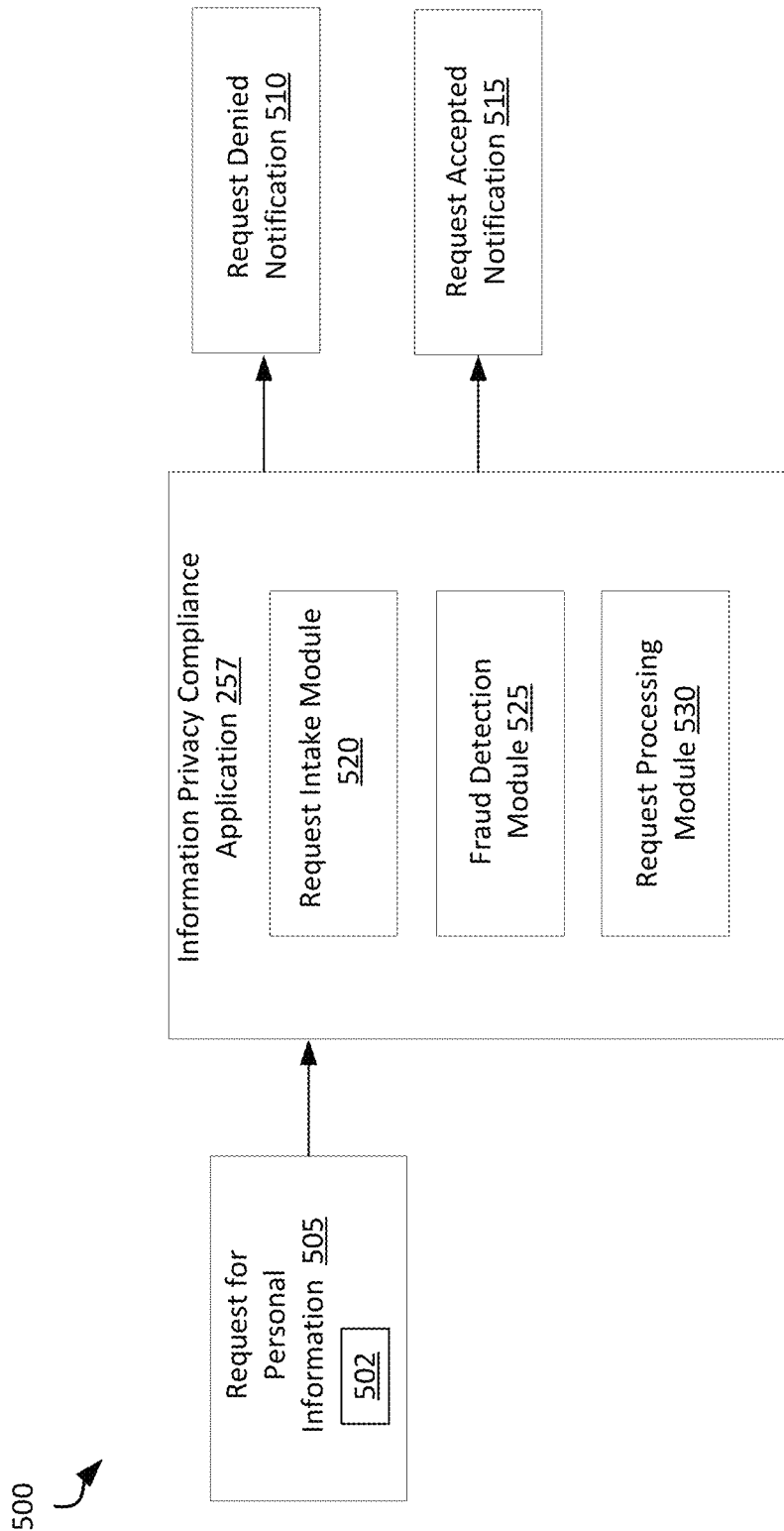
FIG. 5 shows an example diagram of an information privacy compliance application with its verification function, in accordance with some implementations.

FIG. 5 shows an example diagram of an information privacy compliance application with its verification function, in accordance with some implementations. In diagram 500, information privacy compliance application 257 may be configured to include request intake module 520, fraud detection module 525 and request processing module 530. The request for personal information 505 may be generated by the customer 350 of an entity associated with the entity server 255 (shown in FIG. 3). The entity may provide information to enable the customer 350 to initiate the request for personal information. For example, this may be done via a webpage, and the webpage may list options such as emailing, calling a telephone number or filling out an online form.

For some implementations, the information privacy compliance server 256 (shown in FIG. 3) may host the requests for personal information via the request intake module 520. The request intake module 520 may be configured to receive the request provided by the customer 350 via an online form, an email or a call to a telephone number. For some implementations, the request intake module 520 may also be configured to receive a request via an application programming interface (API). For example, the request may be generated by a computer system on behalf of the customer 350.

The information 502 that the customer 350 includes in the request for the personal information from the entity may be referred to as an identifier. The number of identifiers required by an entity in a request may vary but at least one identifier needs to be provided. For example, the identifier may be an email address, a customer ID or a telephone number associated with the customer 350. For some implementations, the request for personal information 505 may include an option to request for limited personal information or full personal information. This option may be offered by an entity. For example, given an email address as an identifier, a limited personal information report may include a telephone number and a home address, while a full personal information report may include a social security number and content of past purchases.

The fraud detection module 525 may be configured to determine whether the request for personal information sent by a customer is a legitimate request, or whether the customer is who they claim to be. For example, when the customer provides an email address in the request for personal information, the fraud detection module 525 may perform operations to determine if the customer is associated with the email address. For some implementations, the fraud detection module 525 may use the information provided by the customer 350 as a first identifier and use the first identifier to discover other identifiers related to the first identifier. For example, the fraud detection module 525 may use the email address provided by the customer 350 to discover a phone number associated with the customer 350 and use the phone number in a question presented to the customer 350.

For some implementations, the fraud detection module 525 may be configured to determine information associated with the customers that may be included in questions to ask the customers for verification. For example, some information associated with a customer may be considered sensitive, while some may not, and the sensitive information may not be included in questions to ask a customer for verification.

For some implementations, the fraud detection module 525 may be configured to determine the type of questions to ask the customer 350 for verification. For example, an entity may prefer the fraud detection module 525 to ask questions relating to a payment method and not questions about the content of a shopping cart. For some implementations, the fraud detection module 525 may be configured to determine the coverage of acceptable types of questions. Determining a coverage may include determining what question to ask to get a high possibility that a question can be answered. This may be useful because a high coverage question will more likely receive an answer from a requester. There is no value in asking a low coverage question. For example, consider using an installer to come to someone's house to build a custom piece of furniture. It's not much use to have a question asking who the installer is if only 0.5% of the customers use such service. Determining coverage may also include deciding whether two questions are the same. For example, a question that asks a requester about a middle name and a question that asks about a middle name initial are essentially the same question because if one knows the middle name then one must know the middle name initial. As such, the question that asks about a middle name initial may have lesser or no value. Referring to the example where the entity is an online furniture business, the entity may store information about a credit card payment method for a previous purchase transaction of the customer 350. In that situation, a question about what type of credit card was used by a customer in a previous transaction may have 100% coverage, where a question about the content of a shopping cart may have lower coverage if the entity does not always store information about the content of the shopping cart. Determining the coverage may help increase the probability that the customer 350 is able to provide an answer to a question to confirm the identity of the customer 350.

The fraud detection module 525 may be configured to determine whether the personal information the entity may have about the customer 350 is considered low risk or high risk. For example, personal information about the customer's browsing habit may be considered low risk, but the personal information about the customer's financial information may be considered high risk. For some implementations, the determination of risk may be based on one or more factors including a type of business that the entity engages in, a type of request for personal information, and a type of personal information that the entity has collected and stored about the requester. As an example of a type of business, when the entity is a furniture business, it may be a considered a low risk type of business as compared to when the entity is a financial institution such as a bank, which may be considered a high risk type of business. As an example of a type of information collected and stored, when the entity is a furniture business, the stored credit card information may be considered high risk as compared to the stored information about items placed in a shopping cart. Similarly, when the entity is a financial institution, the information that a person has a safe deposit box may be considered low risk as compared to the information that the person has a financial portfolio spreading over multiple accounts having high balances. As an example of a type of request for personal information, a request for full report may be considered high risk as compared to a request for a short or abbreviated report where the entity may only have to provide yes or no answers. For some implementations, when the personal information is considered high risk, the fraud detection module 525 may be configured to be more stringent in verifying the identity of the customer 350. For example, there may be more questions to ask, or there may be less tolerance to the number of wrong answers provided by the customer 350, or both. For some implementations, the questions that the fraud detection module 525 present to the customer 350 may be specific about date and time of events that should be known by the customer 350.

The fraud detection module 525 may be configured to collect and evaluate information about a device, a network and a location used by the customer who initiates the request for personal information. For example, the customer may provide a U.S. telephone number as an identifier, but the request is initiated from a location in another country and not in the US. Other factors that may be considered by the fraud detection module 525 to determine fraud may include recency of activity with the entity, extent of customer service interactions with the entity, consistency of type of device used by the customer and past transactions with the entity, etc. For example, when the fraud detection module 525 determines that the entity stores the IP address from the customer's most recent interaction with the entity, the fraud detection module 525 may be able to compare the stored IP address with the IP address when the customer initiates the request for the personal information. As another example, the fraud detection module 525 may ask the customer 350 if the customer can identify a phone number that the customer recently used with the entity among a group of telephone numbers.

For some implementations, the fraud detection module 525 may be configured to determine whether an answer provided by the customer 350 is sufficiently correct enough to be considered as a correct answer even though the answer may not be fully as expected. For example, when the answer includes a certain number of keywords of an expected answer or when an answer includes words that may be considered equivalent to words of an expected answer, the fraud detection module 525 may pass the answer as a correct answer.

For some implementations, the fraud detection module 525 may be configured to determine whether the request for personal information should proceed. The determination may be based on many factors and may include factors relating to the answers provided and the device used by the customer 350, among others. This may include, for example, determining how the customer 350 selects what question to answer and not to answer, and determining how the customer 350 answers questions that require answers that may be considered sensitive, etc. For some implementations, when the fraud detection module 525 determines that it is unable to verify the identity of the customer 350 to a certain level of confidence, the fraud detection module 525 may generate the request denied notification 510; otherwise, the fraud detection module 525 may generate the request accepted notification 515.

The generation of the request accepted notification 515 by the fraud detection module 525 may trigger the operation of the request processing module 530. The request processing module 530 may be configured to retrieve personal information from various databases or systems associated with an entity to respond to the request for personal information from the customer 350. The request processing module 530 may use the information discovered by the data discovery module 430 (shown in FIG. 4) to retrieve the personal information of the customer 350. For example, the request processing module 530 may retrieve the personal information stored in the database 270 associated with the entity server 255 and in the database 310 associated with the third-party server 305.

For some implementations, the request processing module 530 may be configured to perform deletion of personal information based on a deletion request by the customer 350. For some implementations, the request processing module 530 may be configured to operate with the data maintenance module 425 (shown in FIG. 4) to update the personal information that the entity has for the customer 350 based on an update request by the customer 350. For some implementations, the request processing module 530 may be configured to initiate a setting for the personal information of the customer 350 such that the personal information cannot be sold based on a do-not-sell request from the customer 350.

Figure 6A:
FIG. 6A shows an example online request form to request for personal information, in accordance with some implementations.
Figure 6A:

FIG. 6A shows an example online request form to request for personal information, in accordance with some implementations. In diagram 600, the online form 605 may be hosted by the information privacy compliance server 256 (shown in FIG. 3) and may include requester information section 610 to enable the customer 350 to provide a full name and an email address. The online form 605 may also include a request action section 615 to enable the customer 350 to specify whether the request is for a report of the personal information, or the request is for deletion of the personal information. The request may be generated by selecting the "submit" button 620. With the request for personal information, there may be different types of reports depending on the whether the personal information is considered as high risk or low risk as described above. For example, when the request is for a full report, and the information stored is considered high risk, the entity may limit the responses to the categories of information with Yes or No responses. For some implementation, the level of detail in the report may be limited based on the quality of the responses provided by the requester during verification.

Figure 6B:
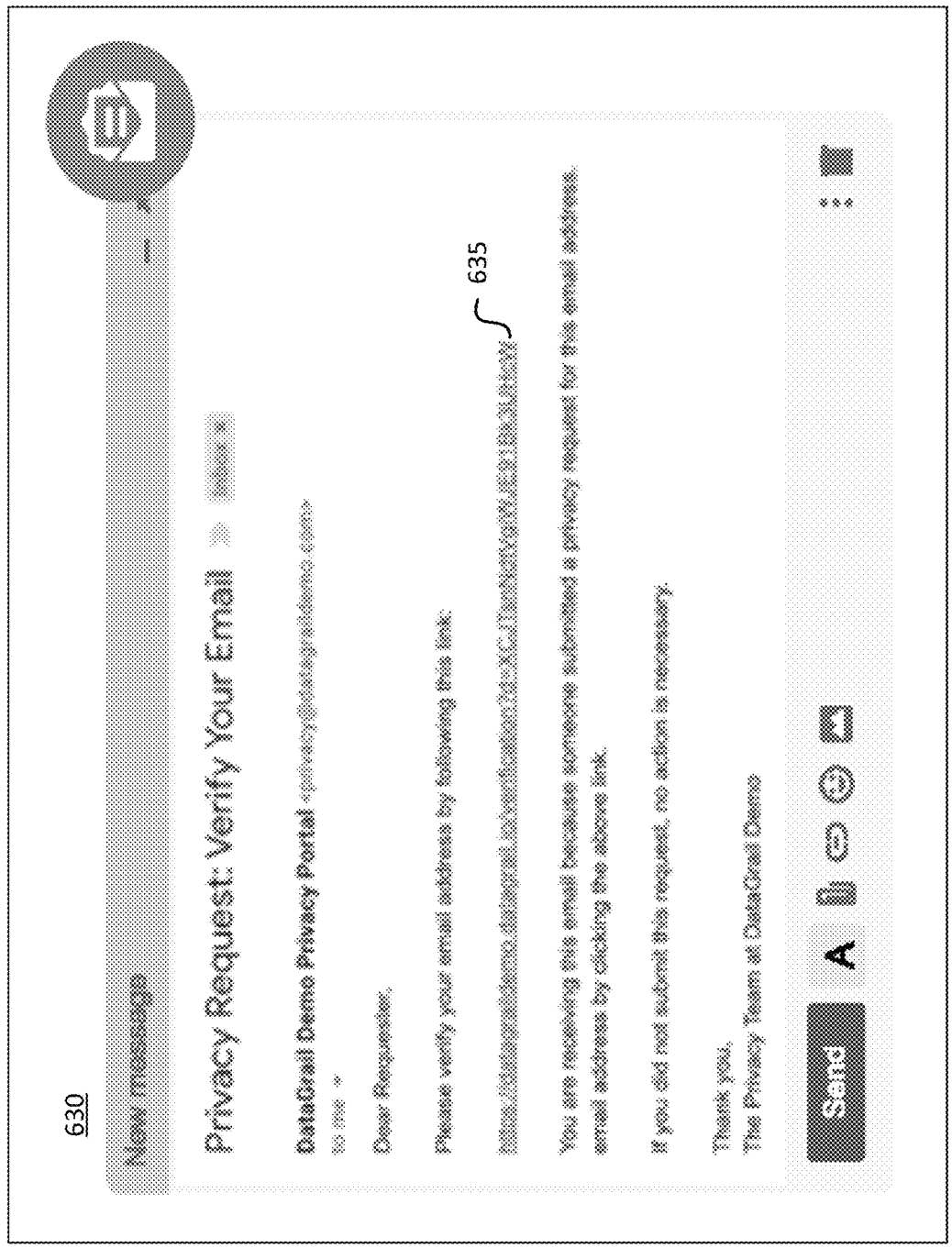
FIG. 6B shows an example online request confirmation email, in accordance with some implementations.

FIG. 6B shows an example online request confirmation email, in accordance with some implementations. In diagram 625, a confirmation email 630 may be generated by the request intake module 520 based on the email address submitted with the online form 605. The confirmation email 630 may include a confirmation link 635 to enable the customer 350 to confirm that the online form 605 was indeed submitted by the customer 350. The confirmation email 630 may also operate as a notification of a potential fraud on the customer 350 by someone else posing as the customer 350 requesting for the personal information.

Figure 6C:
FIG. 6C shows an example of a first verification interface, in accordance with some implementations.

FIG. 6C shows an example of a first verification interface, in accordance with some implementations. In diagram 640, verification interface 640 may be presented to the customer 350 after the fraud detection module 525 receives a notification that the customer 350 has selected the confirmation link 635. The verification interface 640 may display information to the customer 350 explaining why there is a need for verification of the identity of the customer 350 and what the customer 350 may need to do to pass the verification. The verification interface 640 may display questions to the customer 350 to solicit answers that the fraud detection module 525 already knows. For example, the question 650 may ask the customer 350 to verify a phone number, and the question 655 may ask about the customer's last transaction with the entity. In this example, the questions may be considered part of a set of questions to satisfy number of data points that the customer 350 may need to achieve to prove the identity.

Figure 6D:
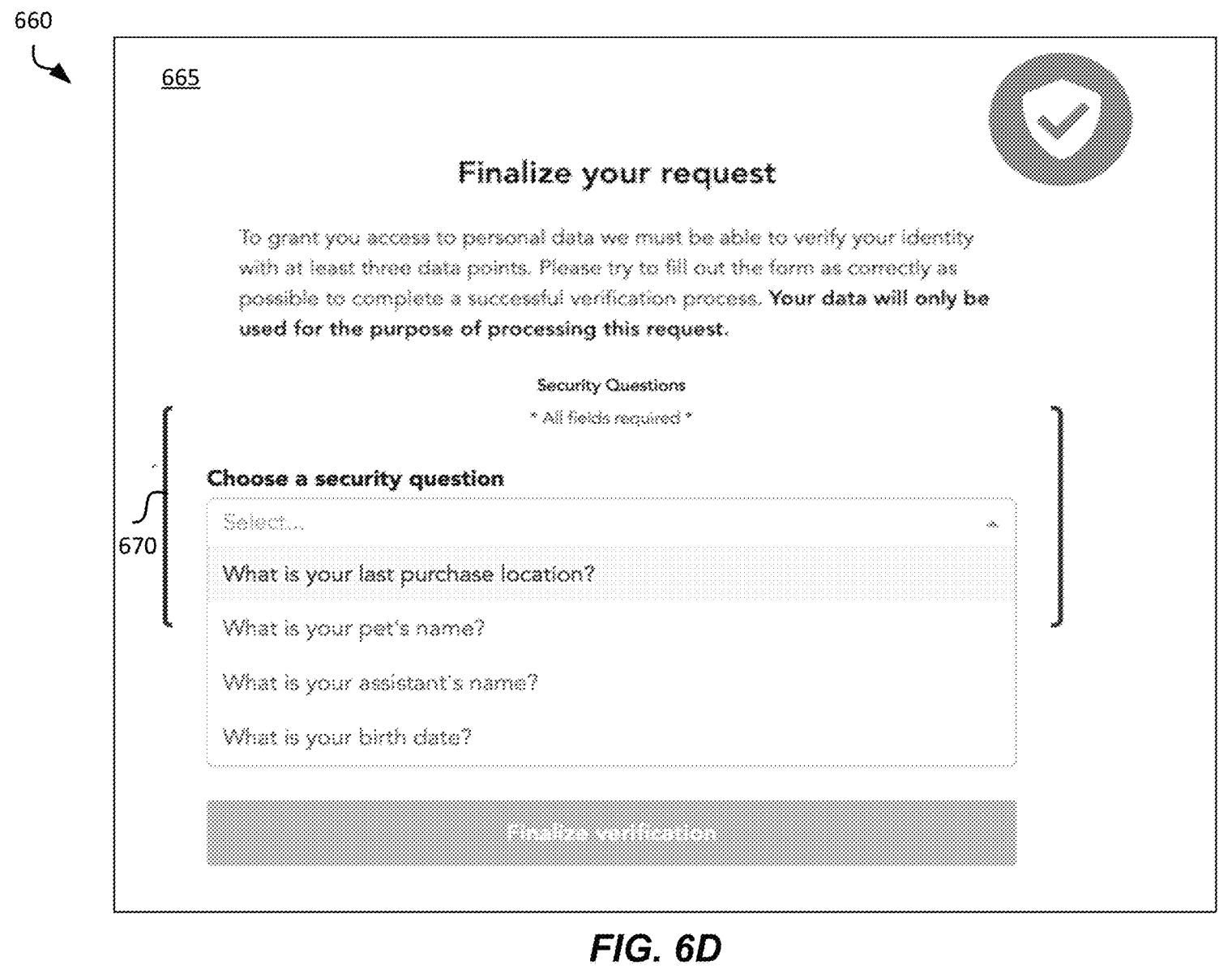

FIG. 6D shows an example of a second verification interface, in accordance with some implementations. In diagram 660, verification interface 665 may be presented to the customer 350 after the fraud detection module 525 confirms that the customer 350 has provided correct answers to the question presented with the verification interface 645. In the verification interface 665, the fraud detection module 525 may display questions that require the customer 350 to have a deeper knowledge which may be less likely to be known by others. For example, the question 670 may be related to the customer's location of last purchase, last item added to shopping cart, last customer success/help interaction, last item browsed, last item configured, last item purchased, last item configured for purchase, last or recent house shopped or viewed, and last usage or interaction in the product.

Figure 7:
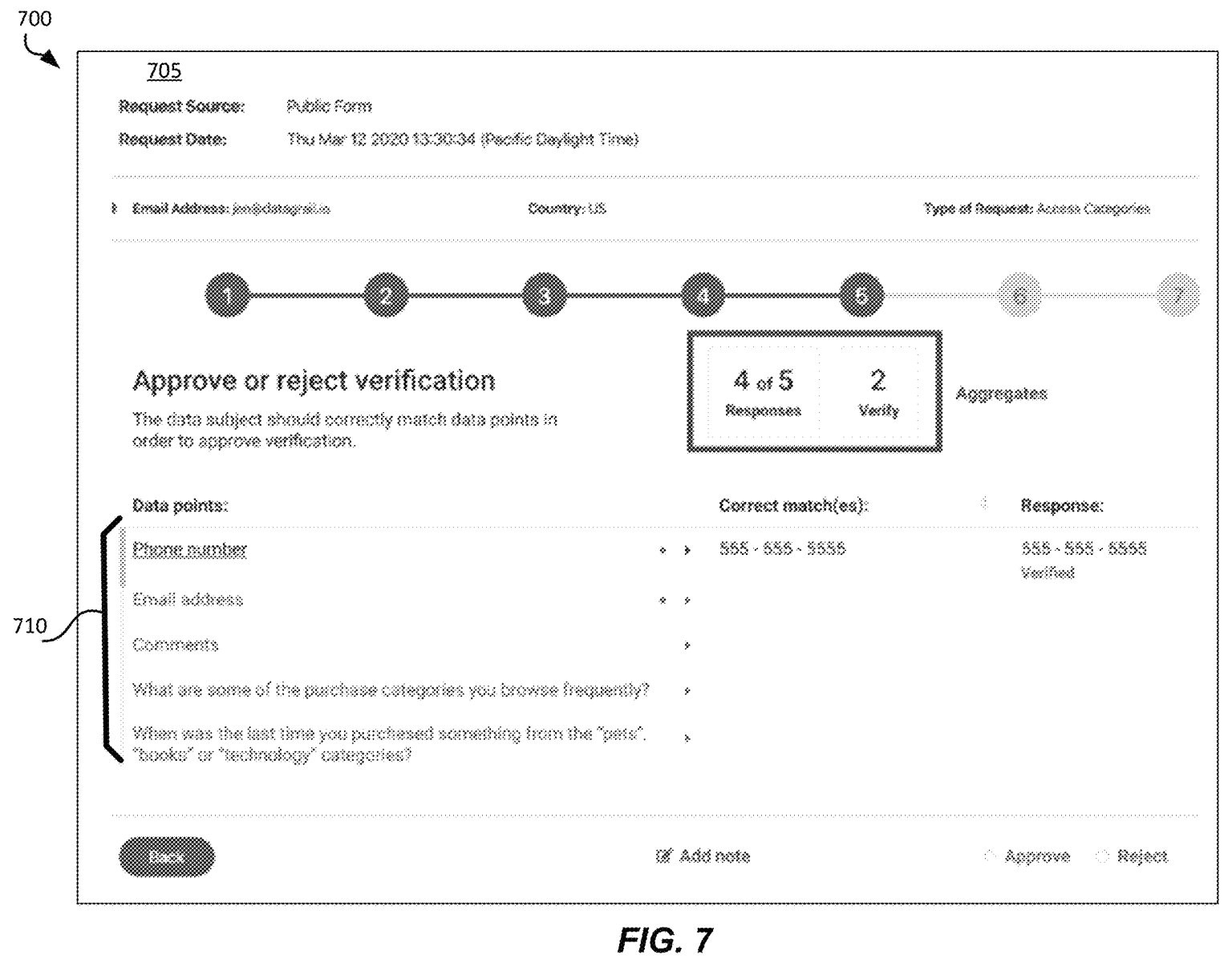

FIG. 7 shows an example of a verification result interface, in accordance with some implementations. In diagram 700, verification result interface 705 may be generated by the fraud detection module 525 to show the verification result based on the answers provided by the customer 350. The verification result interface 705 may be presented to an administrator of the entity that has the personal information of the customer 350 for record keeping. For example, the verification result interface 705 may display a summary 710 of the questions asked, the responses provided, and a number of correct answers. For some implementations, the verification result may be evaluated by the fraud detection module 525 to determine if the answers provided by the customer 350 are sufficiently correct to a certain confidence level (e.g., 2 out of 3 questions correct) to accept or approve the request for personal information. If the fraud detection module 525 determines that the responses provided by the customer 350 fall below a certain confidence level, the fraud detection module may decide to deny or reject the request for personal information.

Figure 8A:
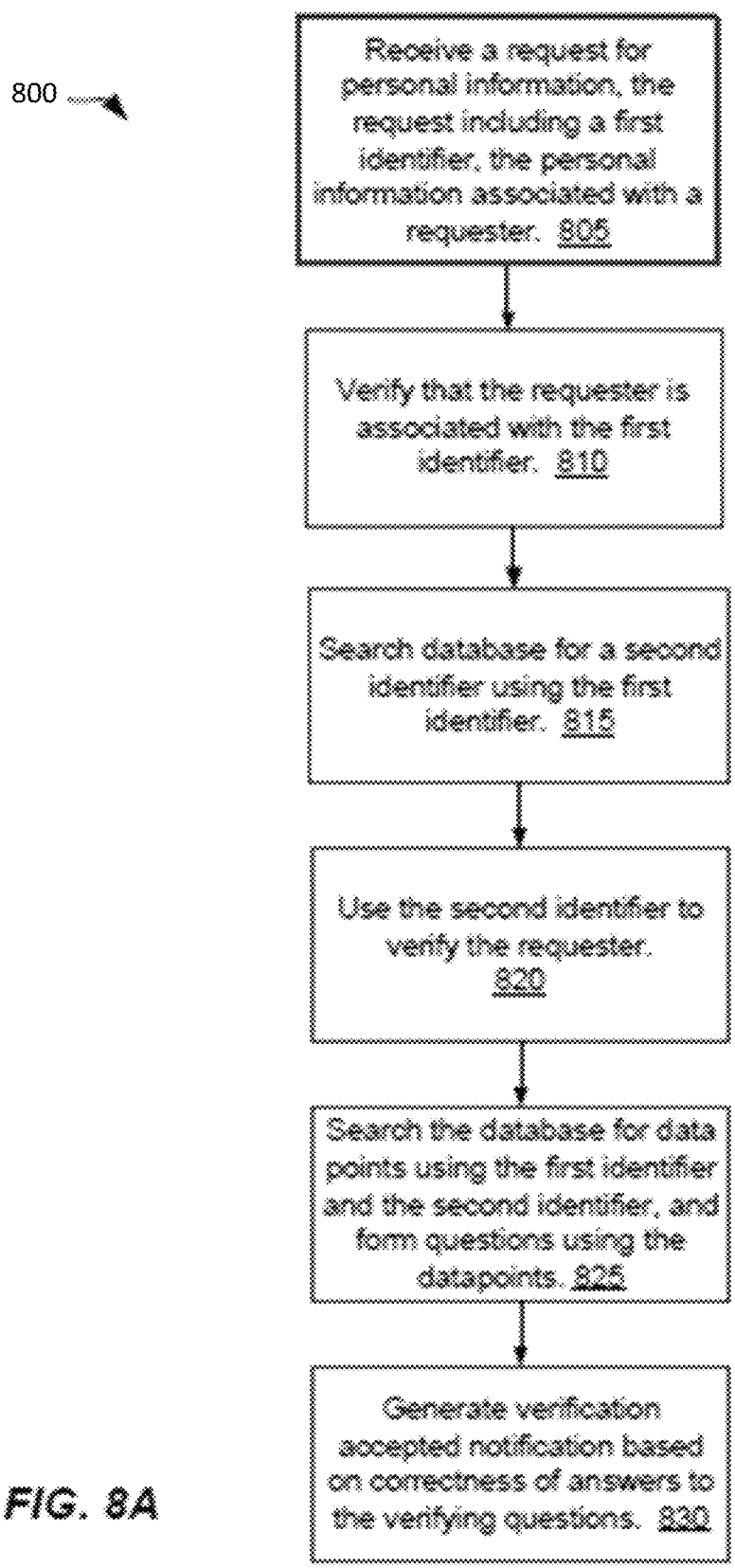
FIG. 8A is an example flow diagram of one process that may be used to verify a request for personal information, in accordance with some implementations.

FIG. 8A is an example flow diagram of one process that may be used to verify a request for personal information, in accordance with some implementations. The process shown in diagram 800 may be related to FIGS. 3, 4 and 5 and associated description. The process may be performed by one or more modules in the information privacy compliance application 257 (shown in FIGS. 4 and 5).

At block 805, a request for personal information may be received. The request for personal information may be submitted by a requester, and it may include an identifier such as, for example, an email address. The request may be received by the request intake module 520 (shown in FIG. 5). At block 810, a verification operation may be performed to determine that the first identifier is associated with the requester. This may be performed by the fraud detection module 525 (shown in FIG. 5).

At block 815, once the requester is confirmed to be associated with the first identifier, a search may be performed to find a second identifier associated with the first identifier. The second identifier is also associated with the requester. The search may be performed by the fraud detection module 525. At block 820, the second identifier may be used to generate a question to be presented to the requester and to verify the requester. This may be performed by the fraud detection module 525. For some implementations, the fraud detection module 525 may not be able to find a second identifier based on the first identifier. In such situation, the operation of block 820 may be skipped, and the operation at block 825 may be performed using only the first identifier.

At block 825, once the requester is verified, the database may be searched to form datapoints using the first identifier and the second identifier. The datapoints may be used to present additional questions to the requester. The search and the formation of the questions may be performed by the fraud detection module 525. At block 830, once the fraud detection module 525 determines that the answers received for the questions are sufficiently correct to a certain level of confidence, a verification accepted notification may be generated by the fraud detection module 525.

Figure 8B:
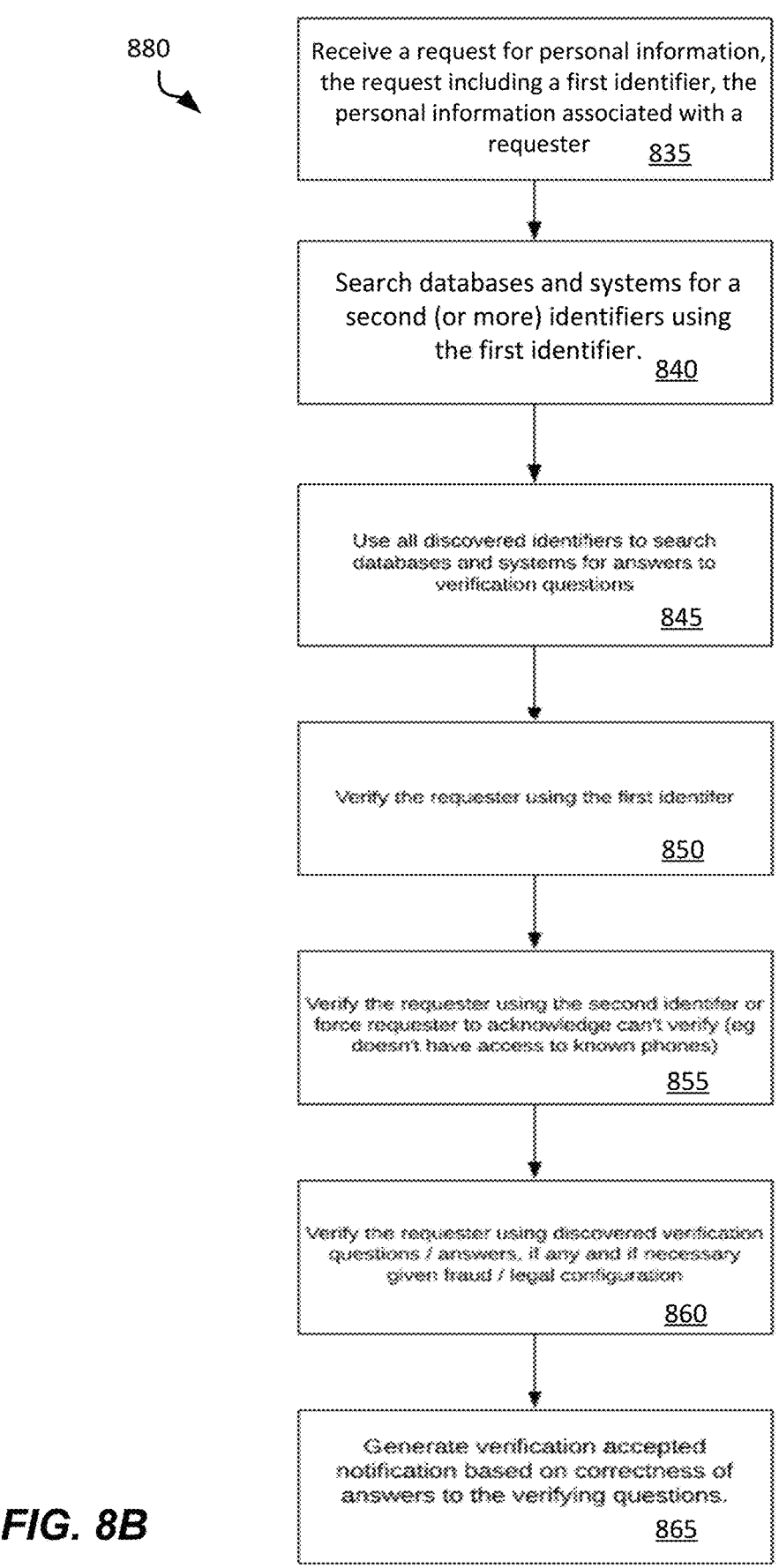
FIG. 8B is an example flow diagram of another process that may be used to verify a request for personal information, in accordance with some implementations.

FIG. 8B is an example flow diagram of another process that may be used to verify a request for personal information, in accordance with some implementations. The process shown in diagram 880 may be related to FIGS. 3, 4 and 5 and associated description. The process may be performed by one or more modules in the information privacy compliance application 257 (shown in FIGS. 4 and 5).

At block 835, a request for personal information may be received. The request for personal information may be submitted by a requester, and it may include an identifier such as, for example, an email address. The request may be received by the request intake module 520 (shown in FIG. 5).

At block 840, a search may be performed into the databases and systems to find the second identifier and other possible identifiers using the first identifier. At block 845, using the discovered identifiers from block 840, a search may be performed into the databases and systems for answers to possible verification questions.

At block 850, verification operation may be performed to determine that the first identifier is associated with the requester. This may be performed by the fraud detection module 525 (shown in FIG. 5).

At block 855, once the requester is confirmed to be associated with the first identifier, verification operation may be performed to determine that the second identifier is associated with the requester. It may be possible that, when the second identifier is a telephone number, the requester may no longer be associated with the same phone number (e.g., change to a different number). In such situation, instead of verifying using the second identifier, the fraud detection module 525 may be configured to request for an acknowledgement that the requester is not associated with the second identifier.

At block 860, additional verification questions may be presented using the information discovered in blocks 840 and 845 to verify the requester. At block 865, once the fraud detection module 525 determines that the answers received for the questions are sufficiently correct to a certain level of confidence, a verification accepted notification may be generated by the fraud detection module 525. It may be noted that the process described in FIG. 8B may be different from the process described in FIG. 8A in that the operations described in blocks 840 and 845 may be performed shortly after receiving the first identifier, and the verification using the first identifier may be performed after the search is completed.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method for verifying a request for personal information, the method comprising:
   receiving, by a server computing system, a request for personal information of a requester, the request associated with a government regulation related to consumer privacy rights, the request including a first identifier identifying the requester;
   determining, by the server computing system, a location where the personal information is stored in a plurality of different databases;
   iteratively searching, by the server computing system based on the determined location of the personal information, the databases using an identifier expansion process based on the first identifier to:
   identify, in a first one of the databases, a second identifier related to the first identifier and identifying the requester, the second identifier associated with one or more past transactions involving the requester and an entity associated with the databases,
   identify a second one of the databases by mapping at least a portion of the personal information from the first database to the second database,
   identify, in the second database, a third identifier related to the second identifier and identifying the requester, the third identifier associated with the one or more past transactions,
   identify a third one of the databases by mapping at least a portion of the personal information from the second database to the third database, and
   identify, in the third database using at least the third identifier, one or more data points associated with the requester and associated with the one or more past transactions;
   forming, by the server computing system, a question using the one or more data points;
   verifying, by the server computing system, identity of the requester using at least the question; and
   based on verifying the identity of the requester, generating, by the server computing system, a notification indicating that the request for the personal information is accepted.

2. The method of claim 1, further comprising verifying, by the server computing system, that the requester is associated with the first identifier.

3. The method of claim 1, further comprising verifying, by the server computing system, that the requester is associated with the second identifier.

4. The method of claim 1, wherein forming the question using the one or more data points includes identifying customer information to ask the requester for verification.

5. The method of claim 1, wherein forming the question using the one or more data points includes determining one or more types of questions to ask the requester for verification, the one or more types of questions including one or more of: a payment method, a content of a shopping cart, or a name of a person.

6. The method of claim 1, the databases including a database associated with the entity and a database associated with a third-party service associated with the entity.

7. The method of claim 1, further comprising:
   transmitting, by the server computing system, a notification to the requester indicating that the request for the personal information is denied based on failing to verify the identity of the requester.

8. A system for verifying a request for personal information comprising:
   one or more processors; and
   a non-transitory computer readable medium storing a plurality of instructions, which when executed, cause the one or more processors of a server computing system to:
   process a request for personal information of a requester, the request associated with a government regulation related to consumer privacy rights, the request including a first identifier identifying the requester;
   determine a location where the personal information is stored in a plurality of different databases;
   iteratively search, based on the determined location of the personal information, the databases using an identifier expansion process based on the first identifier to:
   identify, in a first one of the databases, a second identifier related to the first identifier and identifying the requester, the second identifier associated with one or more past transactions involving the requester and an entity associated with the databases,
   identify a second one of the databases by mapping at least a portion of the personal information from the first database to the second database,
   identify, in the second database, a third identifier related to the second identifier and identifying the requester, the third identifier associated with the one or more past transactions,
   identify a third one of the databases by mapping at least a portion of the personal information from the second database to the third database, and
   identify, in the third database using at least the third identifier, one or more data points associated with the requester and associated with the one or more past transactions;
   form a question using the one or more data points;
   verify identity of the requester using at least the question; and based on verifying the identity of the requester, generate a notification indicating that the request for the personal information is accepted.

9. The system of claim 8, further comprising instructions when executed to verify that the requester is associated with the first identifier.

10. The system of claim 8, further comprising instructions when executed to verify that the requester is associated with the second identifier.

11. The system of claim 8, wherein forming the question using the one or more data points includes identifying customer information to ask the requester for verification.

12. The system of claim 8, wherein forming the question using the one or more data points includes determining one or more types of questions to ask the requester for verification, the one or more types of questions including one or more of: a payment method, a content of a shopping cart, or a name of a person.

13. The system of claim 8, the databases including a database associated with the entity and a database associated with a third-party service associated with the entity.

14. The system of claim 8, further comprising instructions when executed to:
generate a notification indicating that the request for the personal information is denied based on failing to verify the identity of the requester.

15. A computer program product for verifying a request for personal information comprising computer-readable program code to be executed by one or more processors when retrieved from a non-transitory computer-readable medium, the program code including instructions to:
process a request for personal information of a requester, the request associated with a government regulation related to consumer privacy rights, the request including a first identifier identifying the requester;
determine a location where the personal information is stored in a plurality of different databases;
iteratively search, based on the determined location of the personal information, the databases using an identifier expansion process base on the first identifier to:
identify, in a first one of the databases, a second identifier related to the first identifier and identifying the requester, the second identifier associated with one or more past transactions involving the requester and an entity associated with the databases,
identify a second one of the databases by mapping at least a portion of the personal information from the first database to the second database,
identify, in the second database, a third identifier related to the second identifier and identifying the requester, the third identifier associated with the one or more past transactions,
identify a third one of the databases by mapping at least a portion of the personal information from the second database to the third database, and
identify, in the third database using at least the third identifier, one or more data points associated with the requester and associated with the one or more past transactions;
form a question using the one or more data points;
verify identity of the requester using at least the question; and
based on verifying the identity of the requester, generate a notification indicating that the request for the personal information is accepted.

16. The computer program product of claim 15, the program code further including instructions to verify that the requester is associated with the first identifier.

17. The computer program product of claim 15, the program code further including instructions to verify that the requester is associated with the second identifier.

18. The computer program product of claim 15, wherein forming the question using the one or more data points includes identifying customer information to ask the requester for verification.

19. The computer program product of claim 15, wherein forming the question using the one or more data points includes determining one or more types of questions to ask the requester for verification, the one or more types of questions including one or more of: a payment method, a content of a shopping cart, or a name of a person.

20. The computer program product of claim 15, the databases including a database associated with the entity and a database associated with a third-party service associated with the entity.

21. The computer program product of claim 15, the program code further including instructions to generate a notification indicating that the request for the personal information is denied based on failing to verify the identity of the requester.

\* \* \* \* \*